US005506054A

United States Patent [19]

Browning et al.

[11] Patent Number: 5,506,054

[45] Date of Patent: Apr. 9, 1996

[54] ULTRA HIGH FREQUENCY ABSORBING MATERIAL CAPABLE OF RESISTING A HIGH TEMPERATURE ENVIRONMENT AND METHOD FOR FABRICATING IT

[75] Inventors: Melvin F. Browning, Columbus; John M. Blocher, Jr., Oxford, both of Ohio

[73] Assignee: The United States of America as represented by the Secretary of the Air Force, Washington, D.C.

[21] Appl. No.: 346,718

[22] Filed: Jan. 13, 1982

[51] Int. Cl.[6] .......... B32B 5/16

[52] U.S. Cl. .......... 428/403; 106/286.5; 427/380; 342/52

[58] Field of Search .......... 106/86; 264/61, 264/63; 343/18 B:18 E; 423/417; 427/380; 428/403; 342/52

[56] References Cited

U.S. PATENT DOCUMENTS 3,943,217 3/1976 Rother .......... 264/61

FOREIGN PATENT DOCUMENTS 586886 11/1959 Canada .......... 427/380

*Primary Examiner*—Donald P. Walsh
*Assistant Examiner*—Anthony R. Chi
*Attorney, Agent, or Firm*—Bernard E. Franz; Thomas L. Kundert

[57] ABSTRACT

This invention involves a method of providing suitable electrical isolation for small metal particles (such as iron) from each other, agglomerating these particles into a larger size, and overcoating the agglomerates to provide environmental protection. A product of this type has attractive electromagnetic absorbing properties at ultra high frequencies even when used in a high temperature environment that would have oxidized uncoated iron particles with resultant deterioration of its absorbing properties.

5 Claims, No Drawings

ULTRA HIGH FREQUENCY ABSORBING MATERIAL CAPABLE OF RESISTING A HIGH TEMPERATURE ENVIRONMENT AND METHOD FOR FABRICATING IT

RIGHTS OF THE GOVERNMENT

The invention described herein may be manufactured and used by or for the Government of the United States for all governmental purposes without the payment of any royalty.

BACKGROUND OF THE INVENTION

The field of the invention is in the electronic countermeasure art and more particularly that of radar absorbing materials for passive ECM.

The purpose of jamming a radar is to create deliberate interference and to degrade the radar's usefulness as part of a weapon system. The various techniques that electronically interfer with radar performance are called electronic countermeasures (ECM). Electronic countermeasures can be divided into two classes, generally known as confusion jamming or deception jamming. Both confusion and deception countermeasures may be created with either active or passive devices. Active countermeasures are those which radiate electromagnetic energy. They include noise jammers and repeater jammers. Passive countermeasures do not radiate of their own accord and include chaff, decoys, and electromagnetic absorbing materials.

Certain materials are capable of absorbing radio waves very strongly. Waves traveling in these materials will be attenuated greatly within a short distance, of the order of mills. This absorption of electromagnetic energy effectively achieves a reduction of the radar cross section of the target. As such, the return signal to the originating radar will be greatly reduced in intensity and will substantially degrade the operating effectiveness of the radar.

Ideally, the optimum radar absorbing material would be a paint-like material effective at all polarizations over a broad range of frequencies and angles of incidence. Unfortunately, such a material does not exist. Practically, the type of absorber which would be most effective in a given situation is highly dependent upon the radar frequency, target shape and dimensions, bandwidth required, and the physical constraints such as weight, thickness, strength, environment, etc., which are placed on the absorber.

Attempts to achieve the greatest amount of absorption within such constraints has led to the use of carbonyl iron particles within a dielectric material as the most effective radar absorbing material. Typically, these iron particles are uniformly distributed throughout the material with approximately equal interparticle spacing. The objective of this technique is to fill or load the dielectric material with the maximum number of carbonyl iron particles possible while maintaining a small but required spacing between the particles. Such spacing results in a homogeneous mixture of particles within the material while providing the electrical insulation necessary to accomplish the absorption of electromagnetic waves.

One of the chief environmental constraints affecting radar absorbing material is temperature. The frictional forces that are encountered due to the speed of today's military aircraft create extremely high temperatures on the skin of the aircraft. Radar absorbing material employed on such aircraft must be engineered for such heat. For instance, the typical dielectric material of plastic that is used for low temperature applications now is replaced by a ceramic material that can better accommodate the high temperature environment. One temperature related problem has continually baffled engineers however. This is the problem of oxidation of the carbonyl iron particles within the material. The high temperatures and resultant heat causes the unprotected iron particles to oxidize very fast and renders them worthless as an absorber material. The deterioration in the radar absorbing properties of this material caused by the rapid rate of oxidation results in an increase in vulnerability of the aircraft to radar guided threats, not to mention the tremendous waste of time, energy, and money in formulating and applying the then worthless absorbing material.

SUMMARY OF THE INVENTION

The present invention relates to radar absorbing material capable of withstanding a high temperature environment and a process to be utilized for its fabrication.

It is therefore an object of the invention to provide a new and improved process for protecting carbonyl iron particles within radar absorbing material from oxidizing rapidly.

Another object of the invention is to provide sufficient electrical isolation between adjacent carbonyl iron particles to properly perform the absorption process.

According to the invention, individual carbonyl iron particles are thinly coated with a metal oxide, such as $Al_2O_3$ for particle isolation. Next, these lightly coated particles are agglomerated to form larger particles. The agglomerates are then overcoated with a metal oxide, such as $Al_2O_3$, of sufficient thickness to provide oxidation resistance at elevated temperatures.

A feature of the invention is the provision that the metal oxide coating provides electrical isolation between particles while also providing a barrier against oxygen entering the agglomerate.

A feature of the invention is the provision that a thick metal oxide coating is applied to the agglomerate rather than the individual particles thus allowing more particles to be loaded into the dielectric material.

DETAILED DESCRIPTION

In carrying out the process, small metal particles, such as carbonyl iron of less than 10 microns, are coated with a thin coating of a metal oxide, such as $Al_2O_3$. Only the thickness of the coating needed to give the required isolation is used, this coating being insufficient to provide oxidation resistance. Typically, this coating is less than 0.5 micron. Next, the lightly coated particles are agglomerated to form clusters, typically 200 microns in size. Finally, the clusters are overcoated with a metal oxide, such as $Al_2O_3$, in sufficient thickness to provide oxidation resistance at elevated temperatures. In the case of $Al_2O_3$, a 4 micron overcoating is sufficient to give the needed protection. These clusters are then loaded into the ceramic material.

As with the isolation coating, the oxidation barrier coating should also be of minimum thickness so as to maximize the number of particles that can be included and maintain the attractive electromagnetic absorbing properties. This relationship between the amount of iron particles and the electromagnetic properties prompted the generation of this agglomeration procedure since a relatively thick protective coating can be provided without the significant loss of iron concentration that would result from applying coatings of this thickness to individual particles.

Both the isolation coating and the agglomeration overcoating are accomplished using a conventional chemical vapor deposition technique. This technique includes the chemical scrubbing of the iron particles and placing a given amount into a reaction chamber. A given quantity of precursors which will react to form a metal oxide, such as $Al_2O_3$, is released in vapor form into the chamber which is heated. At this point the metal oxide will attach itself to the particles resulting in the proper coating. Care must be taken to control the thickness of the coating. This can be accomplished by release of a known quantity of reactants into the given chamber and noting the yield of thickness attached to the particles.

Thus, while preferred constructional features of the invention are embodied in the structure illustrated herein, it is to be understood that changes and variations may be made by the skilled in the art without departing from the spirit and scope of the invention.

We claim:

1. A method for providing oxidation resistance for carbonyl iron particles at elevated temperatures comprising the steps of:

a. applying a thin coat of metal oxide to the individual carbonyl iron particles of sufficient thickness to provide electrical isolation;

b. agglomerating said individual particles into clusters of particles; and c. applying a second coat of a metal oxide to the clusters of particles of sufficient thickness to provide oxidation resistance.

2. The method of claim 1, wherein said coatings of metal oxide includes using a chemical vapor deposition technique wherein chemically scrubbed carbonyl iron particles of a given amount are placed into a heated chamber followed by a release of a known quantity of precursors into said heated chamber to form said metal oxide that attaches itself to particles resulting in a coating covering said particles.

3. A radar absorbing material capable of resisting oxidation at high temperature comprising: clusters of carbonyl iron particles loaded into a dielectric ceramic material, said clusters being individual carbonyl iron particles coated with a metal oxide of sufficient thickness to provide electrical isolation between particles, said particles agglomerated into clusters, and said clusters coated with a second coating of a metal oxide of sufficient thickness to provide oxidation resistance.

4. The method of claim 1, or 2 wherein said metal oxide is $Al_2O_3$.

5. The material of claim 3, wherein said metal oxide is $Al_2O_3$.

* * * * *